Oct. 13, 1959    A. BRUEDER    2,908,359
BRAKE SYSTEM
Filed March 16, 1956    3 Sheets-Sheet 1
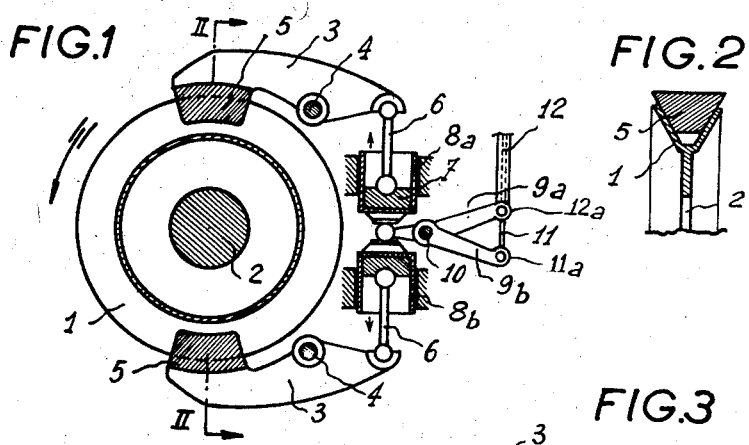
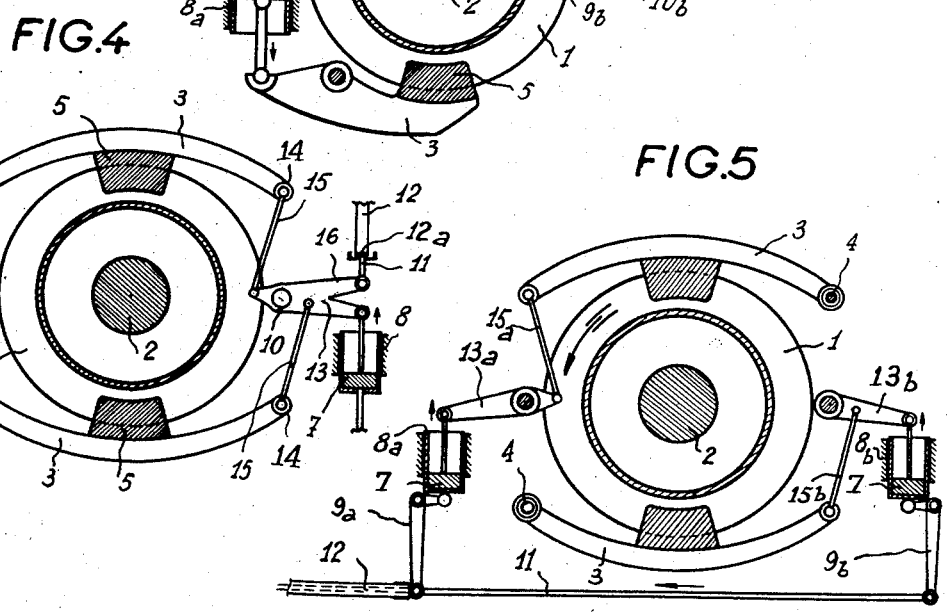

Oct. 13, 1959 A. BRUEDER 2,908,359
BRAKE SYSTEM
Filed March 16, 1956 3 Sheets-Sheet 2

Oct. 13, 1959 A. BRUEDER 2,908,359
BRAKE SYSTEM
Filed March 16, 1956 3 Sheets-Sheet 3

United States Patent Office 2,908,359
Patented Oct. 13, 1959

2,908,359

BRAKE SYSTEM

Antoine Brueder, Paris, France, assignor to Societe Anonyme Andre Citroen, Paris, France Application March 16, 1956, Serial No. 572,156

Claims priority, application France March 19, 1955

6 Claims. (Cl. 188—106)

Brake systems for vehicles are already known wherein the braking member comprises a trapezoidal-section brake shoe adapted to enter radially into engagement with a circular groove of corresponding cross sectional contour rigidly secured to the shaft to be retarded.

It is the object of the present invention to combine such a brake system with actuating means of hydraulic or pneumatic character.

Such a combination will possess numerous advantages over the hydraulic brakes currently used in automotive vehicles, wherein the hydraulic actuating cylinders (wheel cylinders) are positioned with the wheels, near the brake shoe and in a very restricted space.

It will make it possible to remove the hydraulic system away from the frictional elements, thereby simultaneously eliminating sources of temperature elevation and vaporization effects, and making available the necessary space to facilitate inspection adjustment and replacement of brake linings and also providing a rugged and efficient wear compensating arrangement.

Preferably, in order to ensure satisfactory balancing of the forces involved and an absence of reaction stress upon the bearings supporting the shaft, the brake includes two pivoted levers symmetrically arranged relatively to a diametric plane or the centre of the pulley. An actuating cylinder may then be provided for each lever, or a common actuating cylinder may be provided simultaneously operating both levers.

Moreover the system of the invention owing to the space thereby made available, is particularly well suited to the simultaneous use of a mechanical control (e.g. a parking brake) in addition to the hydraulic control, acting through the intermediacy of one of the cylinder or piston elements of the hydraulic actuator.

Various forms of embodiment of a brake system according to the invention are described hereinafter by way of example but not of limitation, with reference to the accompanying drawings wherein:

Fig. 1 is a sectional view of a first embodiment;

Fig. 2 is a section on line II—II of Fig. 1;

Figs. 3 to 5 are views similar to Fig. 1 for other embodiments;

Figure 8:
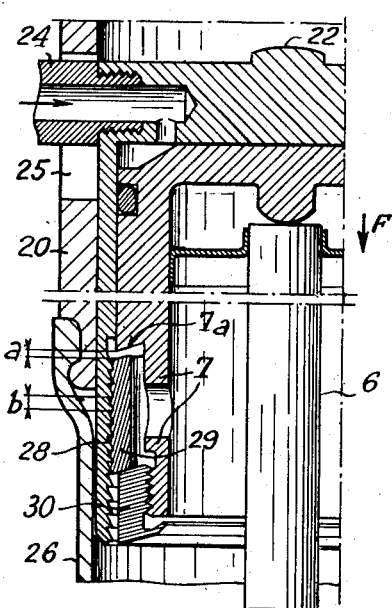
Figure 9:
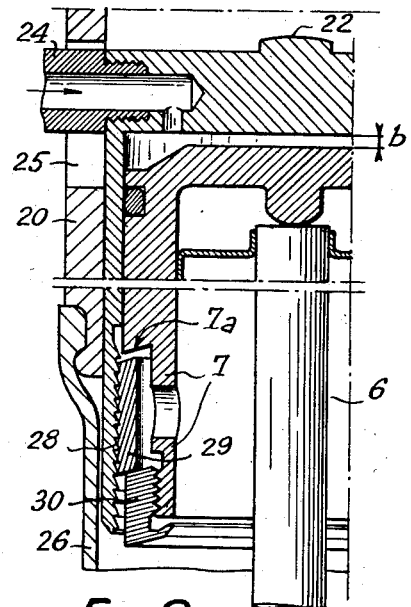
Figure 7:
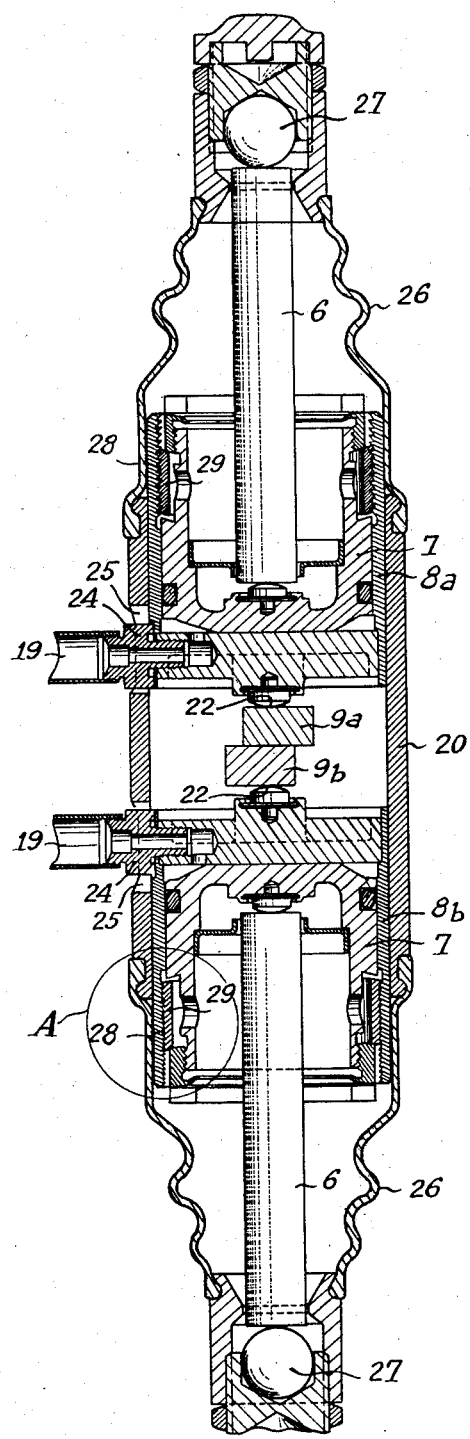
Fig. 7 is a large scale sectional view on VII—VII (Fig. 6)
Figure 10:
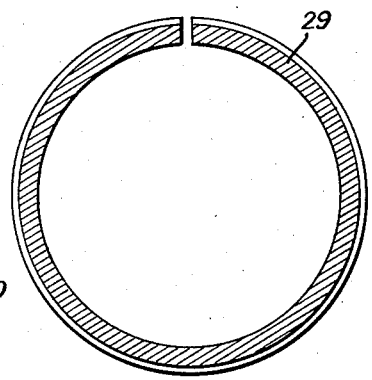

Figs. 8 and 9 illustrate further large scale sectional views of the wear compensating system in two operating conditions thereof; and Fig. 10 is a detailed sectional view of split ring 29 included in the wear compensating system of Figs. 7, 8 and 9, with such view being taken in a plane transverse with respect to the axis of the ring.

The brake illustrated in Figs. 1 and 2 comprises a grooved pulley 1 secured to the shaft 2 to be retarded. Two levers 3, symmetrically disposed to either side of a diametric plane of the pulley 1, are pivoted at intermediate points 4 of the length thereof on pivots fixed to the vehicle frame and carry at their one ends brake shoes 5 of tapered cross sectional contour adapted to be forcibly engaged into the groove of pulley 1. The other end of each lever 3 is connected through a ball-pivoted link 6 with the piston 7 of a cylinder 8a or 8b.

In a conventional manner each cylinder may be supplied with oil under pressure by operation of a brake pedal (not shown) whereby the piston 7 thereof will be displaced to cause brake application by rocking the corresponding lever 3.

Figure 6:
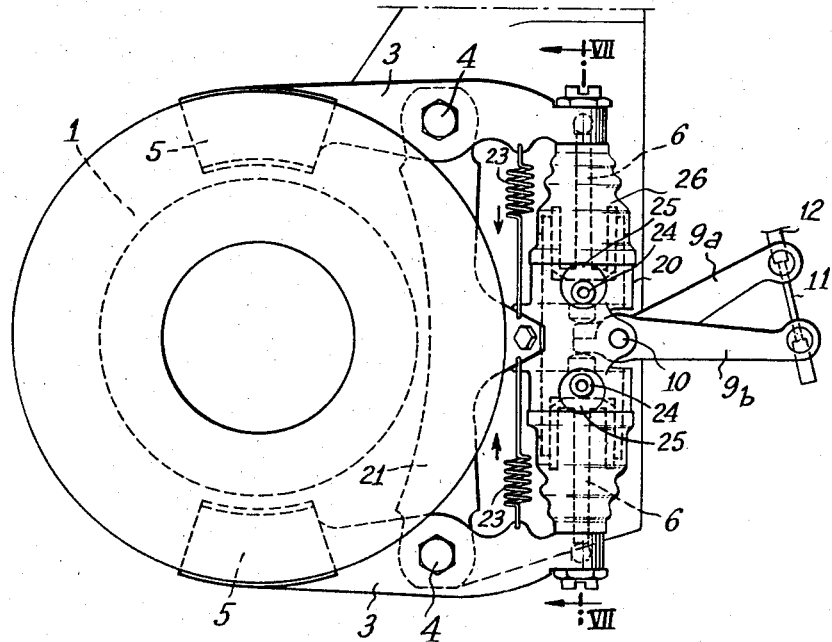
Fig. 6 is a larger scale view of the arrangement of Fig. 1.

In accordance with an important feature of the invention both cylinders 8a and 8b, rather than being fixedly mounted, are supported and guided for displacement in a direction parallel to their axis in a manner to be later described with reference to Figs. 6 and 7 and are adapted for simultaneous displacement in opposite senses through mechanical means. As shown said means include a pair of two-armed levers 9a and 9b pivoted on a common fixed pin 10 and engaging the adjacently disposed ends of said cylinders. The two levers are respectively connected to the cable 11 and guide sheath 12 of a brake operating cable actuatable by the driver of the vehicle by means of a conventional control such as a lever or pedal; operation of the control thus acts to draw the points of attachment 11a and 12a of the cable elements towards each other and hence rocks the levers 9a and 9b in opposite directions.

With this arrangement it will be seen that the hydraulic actuating cylinder forms a part of the manual control linkage, thereby considerably facilitating adjustments and making possible among other advantages the provision of a common wear compensating device for both types of brake control, as will be later disclosed in detail.

In the embodiment of Fig. 3, the two levers 3 are symmetrically disposed with respect to the axis of the pulley 1. As before the two cylinders 8a and 8b are adapted for displacement parallel to their common axis and the cable 11 is connected through crank lever 9a, pivoted at 10a, to one of the cylinders while the guide sheath 12 of the cable is connected to the other cylinder by a crank lever 9b pivoted at 10b.

In the embodiment of Fig. 4, the two levers 3 are again symmetrically related with respect to the pulley axis; the pivot 4 is located at one end, the brake shoe 5 is secured at an intermediate point and the levers are rocked by acting on their opposite ends with a single actuator cylinder 8 the piston 7 of which is connected to an auxiliary lever 13 pivoted to the frame as at 10. The lever 13 further is connected with the ends 14 of the levers 3 through pivoted links 15. The cable 11 of the manual (e.g. parking) brake is connected to another arm 16 of the lever 13, with the guide sheath 12 of said cable being blocked in position by means of a stationary stop ring 12a.

In the Figure 5 embodiment the rocker levers 3 are arranged as in Fig. 4, whilst their actuation is achieved through two fluid cylinders 8a and 8b as in Fig. 3. The piston 7 of each cylinder is connected to the related lever 3 through an auxiliary lever 13a or 13b and link 15a or 15b. Moreover, as in the embodiment of Fig. 3, the cable 11 of the parking brake is connected through a bell crank lever 9a to one of the cylinders while the guide sheath 12 of the cable is connected by crank lever 9b to the other cylinder.

Figs. 6, 7, 8 and 9 illustrate one practical embodiment of the system schematically shown in Fig. 1. These views show the levers 3 carrying the friction-lined brake shoes 5 and pivoted on pins 4, the levers 3 being operated through links 6 connected with the pistons 7. Each of the pistons may be displaced, either in a conventional manner with respect to the related cylinder 8a or 8b under the effect of pressure oil delivered through the inlet conduits 19, or bodily with the cylinder under the effect of the levers 9a and 9b actuated by manual control. For this purpose the cylinders are guided in a common sleeve 20 rigidly connected to the vehicle frame through a bracket 21 which further carries the pins 4.

The relative displacements of the two cylinders in opposite directions under the action of the links 9a and 9b engaging at 22 the sealed ends of the cylinders, are effected in opposition to the action of springs 23 which at all times tend to rock the levers 3 in the direction indicated by the arrows F, i.e. to disengage brake shoes 5 from the pulley groove 1.

The amount of displacement of cylinders 8a and 8b by mechanical action of the levers 9a and 9b is defined by the clearance of the inlet fittings 24 of conduits 19 cooperating with the walls of the slots 25 formed in the sleeve 20 and through which said fittings are inserted.

Flexible protective seals 26 are illustrated at 26 between the bodies of cylinders 8a and 8b and the balls 27 providing swivel joints between the piston rods 6 and rocker levers 3.

A wear compensating system according to this invention is shown at A in Fig. 7 and illustrated on an enlarged scale in Figs. 8 and 9. It essentially comprises a set of circumferential or helical grooves or furrows 28, having a ratchet or sawtooth profile, cut round the internal periphery of each cylinder and engaged by corresponding ratchet teeth formed on the external periphery of a cylindrical ring 29 slotted along a generatrix thereof so as to be resiliently applied against the inner cylinder wall. The ring 29 when at rest is applied against a stop 30 in screw threaded engagement with the body of piston 7, there being a clearance space $a$ provided at the other end between the split ring 29 and the wall of the piston.

On hydraulic application of the brake, the piston 7 is displaced in the direction indicated by arrow F' with respect to the cylinder 8, thereby bringing its shoulder 7a into engagement with the end surface of split ring 29 upon the displacement having attained a value corresponding to the clearance space $a$. As it continues its displacement the piston pushes back the ring, with the teeth of the ring 29 ratcheting over the teeth 28 of the cylinder.

The initial setting of the brakes is so predetermined that braking action is obtained for a total displacement less than $(a+b)$ (where $b$ designates the pitch of the ratchet teeth), i.e., before the ring 29 has slid along the part 28 by an amount equal to one tooth length. On release of the brake, the piston 7 will therefore be restored to its former position without having altered the position of ring 29 relatively to the cylinder. If on the other hand, owing to wear of the brake linings, the braking displacement is greater than $(a+b)$ (Fig. 9) the ring 29 will advance by the amount of one tooth along the teeth 28 of the cylinder, and during the ensuing return or backing displacement, the piston will only move back by an amount $b$. The space thus formed is immediately filled with oil from the reservoir. As a result in the new idle position the link 6 has advanced by the same amount, resulting in a rocking of the lever 3 and a corresponding penetration of shoe 5 into the groove.

It will be observed that in the position illustrated in Fig. 9, since the cushion of oil occupying the space $b$ in the end of the cylinder is uncompressible, the mechanical actuation of the brake through the cylinder will be performed positively so that the wear compensating action is effective both upon the mechanical control and on the hydraulical control.

What I claim is:

1. A brake system comprising a lever rockable to and from a braking position, a fluid actuator comprising a cylinder and a piston slidable therein and having an annular recess in its outer periphery, means connecting said piston to the lever, means for applying fluid pressure to said cylinder for displacing said piston relative to the cylinder in the direction for rocking said lever towards said braking position, yieldable means for rocking said lever away from said braking position, and wear-compensating means including ratchet teeth formed peripherally of a longitudinal section of an inner cylindrical surface of said cylinder and a ring having complementary ratchet teeth formed peripherally of the outer surface thereof and adapted to resiliently engage the first mentioned ratchet teeth, said ring fitting in said annular recess and the latter having its longitudinally spaced walls spaced a predetermined distance in excess of the longitudinal spacing of the end walls of said ring for lost-motion cooperation therewith, the ratchet teeth on said cylinder and the ratchet teeth on said ring cooperating, in response to the amount of displacement of said piston in the one direction required to bring the lever to said braking position, for reducing the amount of displacement of said piston in the reverse direction by a predetermined incremental quantity every time the first mentioned amount has exceeded a predetermined value.

2. A brake system as in claim 1; wherein said annular recess is externally delimited by a stop member which is screw threaded on said piston.

3. A brake system as in claim 1; wherein said ratchet teeth on the cylinder and said ratchet teeth on said ring are helically arranged, and said ring is screwed into said cylinder.

4. A brake system as in claim 1; further comprising a grooved pulley, and a brake lining of truncated conical cross-section carried by said lever and adapted to be wedged in said grooved pulley.

5. A brake system as in claim 4; wherein said grooved pulley includes a metal disc and diverging side plates extending from the periphery of said disc.

6. A brake system as in claim 1; further comprising a fixed support having said cylinder slidably mounted therein, and manually operable control means connected to said cylinder to move said cylinder and piston in the direction for rocking said lever towards braking position.

References Cited in the file of this patent

UNITED STATES PATENTS

| | | |
|---|---|---|
| 1,633,773 | Craig | June 28, 1927 |
| 2,391,074 | Schnell | Dec. 18, 1945 |
| 2,531,740 | Orscheln | Nov. 28, 1950 |

FOREIGN PATENTS

| | | |
|---|---|---|
| 337,094 | Germany | May 24, 1921 |
| 383,694 | Great Britain | Nov. 24, 1932 |
| 524,972 | Great Britain | Aug. 19, 1940 |